United States Patent [19]  
Fried et al.

[11] 3,718,643  
[45] Feb. 27, 1973

[54] DERIVATIVES OF BIS(-HYDROXYARYL)ALKANOIC ACIDS

[75] Inventors: Josef Fried, Chicago, Ill.; Edward J. Pribyl, Metuchen, N.J.; John Krapcho, Somerset, both of N.J.

[73] Assignee: E. R. Squibb & Sons, Inc., New York, N.Y.

[22] Filed: Sept. 30, 1970

[21] Appl. No.: 77,036

Related U.S. Application Data

[63] Continuation-in-part of Ser. No. 793,612, Jan. 23, 1969, abandoned, which is a continuation-in-part of Ser. No. 566,245, July 19, 1966, abandoned, which is a continuation-in-part of Ser. No. 288,630, June 18, 1963, abandoned.

[52] U.S. Cl.......260/243 B, 260/239 B, 260/239 BC, 260/247.5, 260/253, 260/268 R, 260/293.64, 260/306.7, 260/307 F, 260/309.7, 260/326.5 G, 424/200, 424/232, 424/246, 424/248, 424/250, 424/253, 424/267, 424/274
[51] Int. Cl.....C07d 87/28, C07d 93/10, C07d 27/04
[58] Field of Search ..260/253, 243 B, 309.7, 293.64, 260/306.7, 268 R, 247.5 R, 307 F, 326.5 G, 239 B, 239 BC

[56] References Cited

UNITED STATES PATENTS

| 2,220,834 | 11/1940 | Bruson et al. | 260/293.64 |
|---|---|---|---|
| 3,449,418 | 6/1969 | Werner et al. | 260/243 B |
| 3,576,874 | 4/1971 | Fried et al. | 260/243 B |
| 3,455,918 | 7/1969 | Marxer et al. | 260/326.5 G |

Primary Examiner—Alex Mazel  
Assistant Examiner—R. J. Gallagher  
Attorney—Lawrence S. Levinson, Merle J. Smith

[57] ABSTRACT

This application relates to alcohols of the general formula

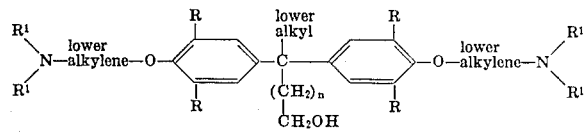

and to acid addition salts thereof. These substances inhibit cholesterol biosynthesis and aid in the regulation of cholesterol in the blood.

7 Claims, No Drawings

DERIVATIVES OF BIS(-HYDROXYARYL)ALKANOIC ACIDS

This application is a continuation-in-part of application Ser. No. 793,612, filed Jan. 23, 1969 now abandoned, which in turn is a continuation-in-part of application Ser. No. 566,245, filed July 19, 1966, now abandoned which is in turn a continuation-in-part of application Ser. No. 288,630, filed June 18, 1963, now abandoned.

SUMMARY OF THE INVENTION

This invention relates to new compounds of the formula (I)

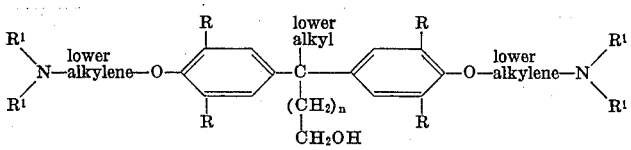

and to acid addition salts thereof.

The symbols in Formula I have the following meanings:

R represents hydrogen, lower alkyl, lower alkoxy or halo.

$R^1$ represents or forms a heterocyclic group with the nitrogen.

n is 1 to 6.

The lower alkyl groups represented by the symbols referred to above include straight and branched chain saturated aliphatic groups such as methyl, ethyl, propyl, isopropyl, butyl, isobutyl, t-butyl, amyl, isoamyl, hexyl, and the like. Methyl and ethyl are preferred. The lower alkoxy groups contain alkyl groups of the same character attached to an oxygen atom. Similarly, the lower alkylene groups are divalent radicals of the same kind.

Each of the four halogens is contemplated by the term "halo," but chlorine and bromine are preferred.

In the basic nitrogen containing radicals represented by each group (II)

$$-N\diagdown\begin{matrix}R^1\\R^1\end{matrix}$$

The nitrogen may join with the groups represented by $R^1$ to form a five to seven membered monocyclic heterocyclic containing, if desired, an oxygen, sulfur or an additional nitrogen atom, (not more than two hetero atoms altogether), that is, the two symbols $R^1$ represent together tetramethylene, pentamethylene, hexamethylene, oxapentamethylene, oxatetramethylene, azahexamethylene, azapentamethylene, azatetramethylene, thiapentamethylene or thiatetramethylene.

The radical II represents heterocyclic groups such as, for example, piperidino, (lower alkyl)piperidino, e.g., dimethylpiperidino, (lower alkoxy)piperidino, e.g., methoxypiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, morpholino, (lower alkyl)morpholino, e.g., 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., $N^4$-methylpiperazino, 2-methylpiperazino or $N^4$-ethylpiperazino, di(lower alkyl)piperazino, e.g., 2,3-dimethylpiperazino, hydroxy-lower alkylpiperazino, e.g., hydroxyethylpiperazino, hexamethyleneimino and homopiperazino.

The new compounds of this invention may be produced from esters of the formula

III $$HO-\underset{R}{\overset{R}{\bigcirc}}-\underset{\underset{COOR^2}{|}}{\overset{\text{lower alkyl}}{\underset{|}{C}}}-\underset{R}{\overset{R}{\bigcirc}}-OH$$

wherein $R^2$ is lower alkyl. These esters (III) are prepared by condensing the appropriate phenol with a keto ester as described in J. Org. Chem. 23, 1004 (1958).

The basic group is introduced by reacting the ester of Formula III with about two proportions of halide of the formula (IV)

$$\diagdown\begin{matrix}R^1\\N-\text{lower alkylene-hal}\\R^1\end{matrix}$$

Preferably a chloride or bromide is the halogen represented by hal, although it is not necessary to be limited to those two.

The resulting ester has the formula (V)

$$R^1\diagdown\underset{R^1}{N}-\text{lower alkylene-O}-\underset{R}{\overset{R}{\bigcirc}}-\underset{\underset{COOR^2}{|}}{\overset{\text{lower alkyl}}{\underset{|}{C}}}-\underset{R}{\overset{R}{\bigcirc}}-O-\text{alkylene-N}\diagdown\begin{matrix}R^1\\R^1\end{matrix}$$

Alternatively, the ester of Formula III can be reacted with a dihalide (hal-lower alkylene-hal) to form a halo alkylene ether which is reacted with an amine

to form the ester of Formula V.

Hydrolysis of the compound of Formula V yields the corresponding acid ($R^2$=H).

Treatment of the ester or acid of Formula V with a reducing agent such as lithium aluminum hydride yields an alcohol of Formula I.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention are therapeutically active substances which are useful as hypocholesteremic agents. They inhibit cholesterol biosynthesis and regulate the cholesterol in the blood of warm-blooded animals such as rats and the like. Thus they are useful in the treatment of conditions such as atherosclerosis. These products may be administered orally or parenterally, e.g., at a dosage level of 2 to 40 mg./kg./day in single or divided doses, preferably 1 to 10 mg./kg. orally two to four times daily, in the form of tablets, capsules, elixirs, injectables, or the like by incorporating the base of Formula I or a physiologically acceptable acid addition salt thereof in a conventional vehicle prepared with suitable vehicle, excipient, lubricant flavor, etc., according to accepted pharmaceutical practice.

The following examples are illustrative of the invention. All temperatures are expressed on the Centigrade scale.

EXAMPLE 1

A. 4,4-Bis[p-(2-pyrrolidinoethoxy)phenyl]valeric acid, methyl ester

A solution of 78.0g. (0.26 mole) of 4,4-bis(p-hydroxyphenyl)valeric acid, methyl ester in 250 ml. of dimethylformamide is treated portionwise with 26g. (0.54 mole) sodium hydride (50 percent dispersion). The reaction is exothermic and the temperature of the mixture is maintained below 60° by cooling. After completion of the addition of the hydride, the slurry is heated to 80°, cooled to 40° and treated with 73g. (0.54 mole) of N-2-chloroethyl-pyrrolidine (released from the hydrochloride; b.p. 67°/12mm) (0.63 mole) in toluene. This mixture is gradually heated and then maintained at 100°–110° for 3 hours. The major portion of the solvent is removed under reduced pressure; the residue is treated with 200 ml. of water and then extracted twice with 600 ml. portions of ether. The ether phases are combined and shaken with (1) 100 ml. of 5 percent sodium bicarbonate solution and (2) 50 ml. of water. The ether phase is dried over magnesium sulfate, charcoal is added and the mixture filtered. The filtrate is concentrated under reduced pressure to give a syrupy material. A solution of the above material in 600 ml. of ether is added to a cold solution of 50 ml. of concentrated hydrochloric acid in 300 ml. of water. The mixture is shaken, the organic phase is discarded and the aqueous phase is washed with 300 ml. of ether. The aqueous phase is treated with a cold solution of 30g. of the sodium hydroxide in 100 ml. of water. The organic phase is extracted with 400 ml. portions of ether (three times). The ether phases are combined, dried over magnesium sulfate, filtered and the filtrate concentrated under reduced pressure to give a syrupy product.

B. 4,4-Bis[p-(2-pyrrolidinoethoxy)phenyl]pentanol

The ester of Example 1A. (25g.) is dissolved in ether and added dropwise to an ethereal solution of 1.5g. of lithium aluminum hydride. The mixture is refluxed for two hours, cooled and treated with a small quantity of sodium hydroxide solution. The ethereal solution of the product, 4,4-bix[p-(2-pyrrolidinoethoxy)phenyl]pentanol, is decanted from the inorganic salts, dried over magnesium sulfate, filtered and the solvent evaporated to give the product.

EXAMPLE 2

4,4-Bix[p-(2-piperidinoethoxy)phenyl]pentanol

Seventy-eight grams (0.26 mole) of 4,4-bis(p-hydroxyphenyl)valeric acid, methyl ester, 26g. (0.54 mole) of 50 percent sodium hydride and 0.54 mole of N-2-chloroethyl piperidine (released from the hydrochloride; are reacted in 250 ml. of dimethylformamide as described in Example 1A. to give 4,4-bis[p-piperidinoethoxy)phenyl]valeric acid methyl ester. Then by following the procedure of Example 1B., 4,4-bis[p-(2-piperidinoethoxy)-phenyl]pentanol is obtained.

EXAMPLE 3

4,4-Bis[p-(2-morpholinoethoxy)phenyl]pentanol

Interaction of 78g. of 4,4-bis(p-hydroxyphenyl)-valeric acid, methyl ester, with 26g. of 50 percent NaH and 82g. of 2-chloroethylmorpholine in dimethylformamide as described in Example 1A. gives 86.0g. of 4,4-bis[p-(2-morpholinoethoxy)phenyl]valeric acid, methyl ester. Treatment of this product according to the procedure of Example 1B. gives the pentanol.

EXAMPLE 4

4,4-Bis[p-[2-(2,6-dimethylmorpholino)ethoxy]phenyl]pentanol

Following the procedure of Example 1A., but substituting an equivalent quantity of 2-(2,6-dimethylmorpholino)ethyl chloride for the 2-diethylaminoethyl chloride, 4,4-bis[p-[2-(2,6-dimethylmorpholino)ethoxy]phenyl]valeric acid, methyl ester is obtained. Treatment of this product according to the procedure of Example 1B. gives the pentanol.

EXAMPLE 5

4,4-Bis[p-[3-(4-methylpiperazino)propoxy]phenyl]pentanol

Following the procedure of Example 1A., but substituting an equivalent amount of 3-(4-methylpiperazino)propyl bromide for the 2-diethylaminoethyl chloride, 4,4-bix[p-[3-(4-methylpiperazino)propoxy]phenyl]valeric acid, ethyl ester is obtained. Treatment of this produce according to the procedure of Example 1B. gives the pentanol.

EXAMPLE 6

3,3-Bis[p-(2-pyrrolidinoethoxy)phenyl]butanol

Following the procedure of Example 1A. but substituting an equivalent quantity of 3,3-bis(p-hydroxyphenyl)butyric acid, ethyl ester for the 4,4-bis(p-hydroxyphenyl)valeric acid, ethyl ester, 3,3-bis[p-(2-pyrrolidinoethoxy)phenyl]-butyric acid, ethyl ester is obtained. Treatment of this product according to the procedure of Example 1B. gives the butanol.

EXAMPLE 7

5,5-Bis[p-(2-thiamorpholinoethoxy)phenyl]hexanol

Following the procedure of Example 1A., but substituting an equivalent quantity of 5,5-bis(p-hydroxyphenl)hexanoic acid, propyl ester and for the 4,4-bis(p-hydroxyphenyl)valeric acid, ethyl ester and thiamorpholino ethyl chloride for the N-2-chlorethylpyrrolidine, 5,5-bis[p-(2-thiamorpholinoethoxy)-phenyl] hexanoic acid, propyl ester is obtained. Treatment of this product according to the procedure of Example 1B. gives the hexanol.

EXAMPLES 8–11

Using the procedure of Example 1A. but replacing the 4,4-bis(p-hydroxyphenyl)valeric acid, ethyl ester by the corresponding esters of A. 5,5-bis(3-methyl-4-hydroxyphenyl)-hexanoic acid,
B. 6,6-bis(3-ethoxy-4-hydroxyphenyl)-heptanoic acid,
C. 7,7-bis(3-chloro-4-hydroxyphenyl)-octanoic acid,
D. 8,8-bis(3,5-dimethyl)-4-hydroxyphenyl nonanoic acid, respectively, there is obtained, respectively:

5,5-Bis[4-(2-pyrrolidinoethoxy)-3-methylphenyl]hexanoic acid, ethyl ester.

6,6-Bis[4-(2-pyrrolidinoethoxyl)-3-ethoxyphenyl]heptanoic acid, ethyl ester.

7,7-Bis[4-(2-pyrrolidinoethoxy)-3-chlorophenyl]octanoic acid, ethyl ester.

8,8-Bis[4-(2-pyrrolidinoethoxy)-3,5-dimethylphenyl]nonanoic acid, ethyl ester.

Treatment of each of the foregoing esters according to the procedure of Example 1B. gives the following products:

Example 8, 5,5-Bis[4-(2-pyrrolidinoethoxy)-3-methylphenyl]hexanol.

Example 9, 6,6-Bis]4-(2-pyrrolidinoethoxy)-3-ethoxyphenyl]heptanol.

Example 10, 7,7-Bis[4-(2-pyrrolidinoethoxy)-3 chlorophenyl]octanol.

Example 11, 8,8-Bis[4-(2-pyrrolidinoethoxy)-3,5-dimethylphenyl]nonanol.

What is claimed is:

1. A compound of the formula

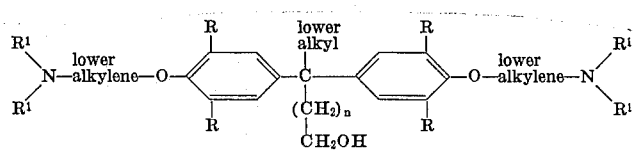

wherein R is hydrogen, lower alkyl having one to six carbons, lower alkoxy having one to six carbons, or halo; the two symbols $R^1$ represent together tetramethylene, pentamethylene, hexamethylene, oxapentamethylene, oxatetramethylene, azahexamethylene, azapentamethylene, azatetramethylene, thiapentamethylene or thiatetramethylene, said groups being unsubstituted or substituted by methyl or methoxy; n is from 1 to 6, and acid addition salts thereof.

2. A compound according to claim 1 wherein each

group is piperidino.

3. A compound according to claim 1 wherein each

is piperazino.

4. A compound according to claim 1 wherein each

is morpholino.

5. A compound according to claim 1 wherein each

is thiamorpholino.

6. A compound according to claim 1 wherein each

is pyrrolidino.

7. A compound according to claim 6 wherein each

group is pyrrolidino, each R is hydrogen, each lower alkylene group has two carbon atoms, the lower alkyl group has one carbon atom and n is 2.

* * * * *